Patented Apr. 30, 1946

2,399,506

UNITED STATES PATENT OFFICE 2,399,506

AMINOALKANOLS OF ARYLACETIC ACIDS

John S. Pierce, Richmond, Va.

No Drawing. Application December 6, 1943,
Serial No. 513,191

5 Claims. (Cl. 260—477)

This invention relates to certain aminoalkanols of arylacetic acids. More specifically, it relates to arylacetates of $\beta$-methyl-$\beta$-monoalkylaminopropanols of the general structure $$C_6H_5CH(A)COOCH_2C(CH_3)_2NHR$$

in which A represents hydrogen, phenyl or alkyl and R is an alkyl group, and salts of the above amino alcohol esters.

The principal object of this invention is to prepare a series of compounds which have valuable pharmacological properties, being particularly useful as antispasmodic agents. A further object is to provide simple methods of making these compounds.

The esters covered by this invention have the general formula $$C_6H_5CH(A)COOCH_2C(CH_3)_2NHR$$

in which A and R have the significance indicated above. These substances are colorless oils, practically insoluble in water but soluble in ether. Many of these oils form fairly soluble salts with acids, for example, hydrochloric, and are purified conveniently, in many cases, by recrystallization from organic solvents such as acetone or acetone and ether. In some cases, however, the reaction product of the oil and hydrochloric acid is not very soluble in either water or ether and in other cases the hydrochloride of the oil is practically insoluble in water but is appreciably soluble in ether. These esters are prepared preferably by the reaction of the appropriate acyl halide and $\beta$-monoalkylamino-$\beta$-methylpropanol, the latter usually and preferably being present as the hydrochloride.

The following examples serve to illustrate the invention but do not limit it in any way.

EXAMPLE I

To 290 parts by weight of 2-methyl-2-mono-n-butylamino-1-propanol was added 250 parts by weight of concentrated hydrochloric acid. The excess hydrochloric acid and the water were removed by vacuum evaporation. 300 parts by weight of phenylacetyl chloride was added. Appreciable hydrogen chloride was evolved. The mixture was heated on a water bath for 4 hours and finally gently with a free flame for about one minute. There was a slight evolution of hydrogen chloride on this last heating. The reaction mixture was dissolved in about two volumes of alcohol and was poured into a large excess of dilute sodium hydroxide solution. The oil which came out of solution was extracted with ether. The ether solution was extracted with dilute hydrochloric acid and the aqueous acid solution was treated with excess sodium hydroxide solution. The oil which came out of solution was extracted with isopropyl ether. Dry hydrogen chloride was passed into the isopropyl ether. The product, $\beta$-methyl-$\beta$-mono-n-butylaminopropyl phenylacetate hydrochloride, came down as an oil. The isopropyl ether was decanted from the oil and the product was recrystallized from dry acetone. (See Table II for melting point and analysis.)

EXAMPLE II

A mixture of 255 parts by weight of 2-methyl-2-mono-n-hexylamino-1-propanol and 146 parts by weight of phenylethylacetyl chloride was heated on an oil bath at 105° C. for one hour. The reaction mixture was dissolved in alcohol and poured into dilute sodium hydroxide solution. The oily insoluble layer was extracted with ether. The ether solution was shaken with N hydrochloric acid but the amino alcohol ester remained largely in the ether solution instead of going in the aqueous acid layer, as in some other cases. The ether solution was evaporated and the oily residue was stirred with hydrochloric acid. On standing for a short time, solidification took place. The product, $\beta$-methyl-$\beta$-mono-n-hexylaminopropyl phenylethylacetate hydrochloride, was recrystallized (and to some extent, thrown out of solution) from anhydrous acetone and dry ether. (See Table II for melting point and analysis.)

EXAMPLE III

Equimolar quantities of $\beta$-methyl-$\beta$-mono-n-amylamino-propanol hydrochloride and diphenylacetyl chloride were heated on an oil bath at 130° for 30 minutes and at 150° for 5 minutes. The reaction product was dissolved in a small volume of alcohol and was poured into a large excess of dilute sodium hydroxide solution. Isopropyl ether was used to extract the oily layer. The isopropyl ether was shaken with dilute sodium hydroxide solution to remove any traces of diphenylacetic acid. Next, it was treated with dilute hydrochloric acid. Some amino alcohol ester dissolved in the acid solution. Some came out of solution as an oil. This oil apparently was the hydrochloride of $\beta$-methyl-$\beta$-mono-n-amylaminopropyl diphenylacetate, for a sample of it crystallized readily when seeded with the above product. The remainder of the oil and the acid solution were made basic with sodium hydroxide solution and extracted with isopropyl ether. The isopropyl ether solution was treated with dry hydrogen chloride, yielding an oil, readily crystallized, on being seeded. Further purification was effected by recrystallization from acetone and dry ether (for melting point and analysis, see Table II).

By methods like those described in the above illustrative examples, with slight modifications, a series of aminoalkanols of arylacetates were prepared. The compounds synthesized in this study are phenylacetates, diphenylacetates or phenylalkylacetates of β-monoalkylaminoethanols, β-methyl-β-monoalkylaminopropanols or β-monoalkylaminobutanols. The type formula for these compounds is $$C_6H_5CH(A)COOCH_2CXYNHR$$

In the compounds prepared, A, X, Y and R were varied as indicated below in Table I. For convenience and for brevity in this report, variations in R are noted as certain combinations of A, X and Y remain unchanged.

TABLE I

*β-Monoalkylaminoalkanols of arylacetic acids*

$C_6H_5CH(A)COOCH_2CXYNHR$

| A | X | Y | R |
|---|---|---|---|
| H | H | H | $C_2H_5$, n-$C_3H_7$, n-$C_7H_{15}$, iso-$C_4H_9$, $CH_2=CHCH_2$ |
| H | $CH_3$ | $CH_3$ | $C_2H_5$, n-$C_3H_7$, n-$C_4H_9$, n-$C_5H_{11}$, n-$C_6H_{13}$, n-$C_{12}H_{25}$, $C_6H_5CH_2$, iso-$C_5H_{11}$ |
| H | H | $C_2H_5$ | $C_2H_5$, n-$C_4H_9$, n-$C_7H_{15}$ |
| $C_6H_5$ | H | H | $C_2H_5$, n-$C_4H_9$, n-$C_7H_{15}$ |
| $C_6H_5$ | $CH_3$ | $CH_3$ | $C_2H_5$, n-$C_3H_7$, n-$C_4H_9$, n-$C_5H_{11}$, n-$C_6H_{13}$, n-$C_{12}H_{25}$, $C_6H_5CH_2$, iso-$C_4H_9$, iso-$C_5H_{11}$ |
| $C_2H_5$ | H | $C_2H_5$ | n-$C_3H_7$, n-$C_4H_9$, n-$C_7H_{15}$, $C_6H_5CH_2$ |
| $C_2H_5$ | H | H | $C_2H_5$, n-$C_4H_9$, n-$C_7H_{15}$ |
| $C_2H_5$ | $CH_3$ | $CH_3$ | $C_2H_5$, n-$C_3H_7$, n-$C_4H_9$, n-$C_6H_{13}$, n-$C_7H_{15}$, n-$C_{12}H_{25}$, $C_6H_5CH_2$ |
| n-$C_3H_7$ | $CH_3$ | $CH_3$ | n-$C_3H_7$, n-$C_4H_9$ |
| n-$C_4H_9$ | $CH_3$ | $CH_3$ | n-$C_4H_9$, n-$C_5H_{11}$ |
| n-$C_4H_9$ | H | $C_2H_5$ | n-$C_3H_7$ |
| n-$C_5H_{11}$ | H | H | n-$C_4H_9$ |
| n-$C_5H_{11}$ | H | H | n-$C_3H_7$, n-$C_4H_9$ |
| n-$C_5H_{11}$ | $CH_3$ | $CH_3$ | $C_2H_5$, n-$C_4H_9$ |
| n-$C_6H_{13}$ | $CH_3$ | $CH_3$ | n-$C_3H_7$, n-$C_4H_9$ |
| n-$C_6H_{13}$ | H | $C_2H_5$ | n-$C_3H_7$ |

For convenience, the arylacetates of the monoalkylaminoalkanols listed in this application usually were isolated as the hydrochlorides. The hydrochlorides were obtained as oils, usually by the addition of hydrogen chloride to an isopropyl ether solution of the free base of the amino alcohol ester. In most cases the oils were not converted to solids but in some cases it was possible to isolate crystalline products. This was particularly true of the hydrochlorides of the β-methyl-β-monoalkylaminopropyl arylacetates. In a pharmaceutical product, purity is a matter of the utmost importance. Therefore, even though some of the above derivatives of aminoalkanols other than β-methyl-β-monoalkylaminopropanols have appreciable antispasmodic activity, they are not included in this application.

Table II contains most of the β-methyl-β-monoalkylaminopropyl arylacetate hydrochlorides which were obtained in a satisfactory crystalline state for melting point determinations and for analyses. Some of these products were crystallized with great difficulty, so it is quite likely that other monoalkylaminoalkyl arylacetate hydrochlorides, by proper treatment with the right solvent, could be converted to crystalline solids. For preliminary tests on isolated intestine, however, solutions of the oils or gummy solids served satisfactorily.

TABLE II

*β-Methyl-β-monoalkylaminopropyl phenylacetate, diphenylacetate and phenylalkylacetate hydrochlorides*

$$C_6H_5CH(A)COOCH_2C(CH_3)_2NHR \cdot HCl$$

| A | R | Molecular formula | M. P.,[1] °C. (uncor.) | Analysis, per cent Cl | |
|---|---|---|---|---|---|
| | | | | Calcd. | Found |
| H | n-$C_3H_7$ | $C_{16}H_{26}O_2NCl$ | 112–113 | 12.41 | 12.61 |
| H | n-$C_4H_9$ | $C_{16}H_{28}O_2NCl$ | 126–127 | 11.83 | 12.00 |
| $C_6H_5$ | n-$C_4H_9$ | $C_{22}H_{30}O_2NCl$ | 158–159 | 9.80 | 9.78 |
| $C_6H_5$ | n-$C_4H_9$ | $C_{22}H_{30}O_2NCl$ | 173–174 | 9.43 | 9.44 |
| $C_2H_5$ | n-$C_5H_{11}$ | $C_{19}H_{32}O_2NCl$ | 117–118 | 9.09 | 9.07 |
| $C_2H_5$ | n-$C_6H_{13}$ | $C_{20}H_{34}O_2NCl$ | 100–101 | 8.78 | 8.75 |
| $C_2H_5$ | iso-$C_5H_{11}$ | $C_{19}H_{32}O_2NCl$ | 156–157 | 9.43 | 9.44 |
| $C_2H_5$ | iso-$C_5H_{11}$ | $C_{19}H_{32}O_2NCl$ | 141–142 | 9.09 | 9.12 |
| $C_2H_5$ | n-$C_3H_7$ | $C_{17}H_{28}O_2NCl$ | 115–116 | 11.30 | 11.46 |
| $C_2H_5$ | n-$C_4H_9$ | $C_{18}H_{30}O_2NCl$ | 109–110 | 10.81 | 10.96 |
| $C_2H_5$ | n-$C_6H_{13}$ | $C_{20}H_{34}O_2NCl$ | 125–126 | 9.96 | 10.21 |

[1] The melting points given in Table II are for identification purposes only, and do not limit the application in any way.

One of the most popular methods of testing the value of an antispasmodic is on the isolated segment of the small intestine, immersed in oxygenated Locke's, Tyrode or some similar solution. Observations were made of the effect on normal muscle tonus or contractions or the influence of the agent on spasms induced by (a) acetyl choline, which acts through the nerve supply, or (b) barium chloride or morphine sulfate, which acts directly on the muscle.

Some of the arylacetates of β-methyl-β-monoalkylaminopropanols covered by this application far surpass atropine as an antispasmodic agent, as shown by certain tests on the isolated segment of the small intestine. Tracings were taken with the hydrochloride of β-methyl-β-mono-n-hexylaminopropyl α-phenylbutyrate $$C_6H_5CHCOOCH_2C(CH_3)_2NHCH_2CH_2CH_2CH_2CH_2CH_3 \cdot HCl$$
$$|$$
$$C_2H_5$$

listed as "A" for brevity in the following discussion.

On the isolated intestine of the rabbit or cat (jejunum), the solution of "A," 1:100,000, caused a marked decrease in the tone of the previously undrugged longitudinal muscle. In most instances this was accompanied by cessation of the rhythmic contractions of the segment. In some instances, although the reduction in tone took place, rhythmic contractions continued. The effect of 1:200,000 solution of "A" was similar, but much less pronounced. It was generally possible to restore tonicity and rhythmic contractions of the segment by washing with plain Locke's solution.

Surrounding the segment of intestine by 1:500,000 solution of acetylcholine bromide and 1:100,000 solution of "A" resulted in a marked spasm of the muscle, with a rapid recovery and return to the preexisting tone-level or to a lower one. This was in marked contrast to the behavior of the segment subjected to the influence of 1:500,000 acetylcholine bromide alone—here, the spasm persisted for a considerable time.

When increased tone of the muscle was induced by morphine sulfate, 1:50,000, this was relieved promptly by substituting a solution of "A," 1:100,000 in morphine sulfate, 1:50,000.

The spasm induced by bathing the segment in barium chloride, 1:50,000, was relieved promptly by substituting a solution of "A," 1:100,000 in barium chloride, 1:50,000.

One objectionable feature of atropine as an antispasmodic is its effect on salivary secretion. A dose of 0.5 mg. of atropine causes some dryness of the mouth and throat and a dose of 5.0 mg. causes one to have difficulty in swallowing (The Pharmacological Basis of Therapeutics, p. 470, 1941 edition, by Goodman and Gilman. Publisher, The Macmillan Company, New York city). In tests carried out with "A," rabbits were injected with 10 mg. of pilocarpine hydrochloride per kilogram, causing excessive salivary secretion. The injection of 5 mg. of "A" per kilogram intravenously had no effect on the flow of saliva.

The effect of 1:100,000 solution of another antispasmodic, β-methyl-β-mono-n-butylaminopropyl α-phenylbutyrate hydrochloride, on the isolated intestinal segment of the rabbit was reduction in rhythmic contractions and decrease in tone. This seemed reversible, contractions being resumed and a return to previous tone-level being produced by washing with Locke's solution. Also, the tone of the isolated intestine of the chicken was reduced markedly by 1:100,000 solution of this antispasmodic.

I claim:

1. As new products, compounds of the structure

in which A is a member of the group hydrogen, phenyl and alkyl of from two to six carbons and R is a primary alkyl radical of from two to six carbons, and salts thereof.

2. As new products, compounds of the structure

in which A is an alkyl group of from two to six carbons and R is a primary alkyl group of from two to six carbons, and salts thereof.

3. As a new compound,

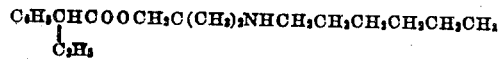

and salts thereof.

4. As a new compound,

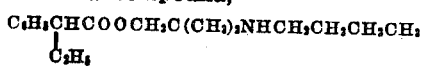

and salts thereof.

5. As a new compound

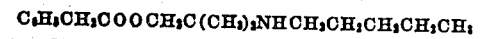

and salts thereof.

JOHN S. PIERCE.